No. 698,961. Patented Apr. 29, 1902.
W. JONES.
STRAINER.
(Application filed Sept. 23, 1901.)
(No Model.)

Witnesses:
Benj. G. Shard
Harry B. Russ

Inventor:
Willard Jones
by S. W. Bates
Atty

UNITED STATES PATENT OFFICE.

WILLARD JONES, OF LISBON, MAINE.

STRAINER.

SPECIFICATION forming part of Letters Patent No. 698,961, dated April 29, 1902.

Application filed September 23, 1901. Serial No. 76,175. (No model.)

*To all whom it may concern:*

Be it known that I, WILLARD JONES, a citizen of the United States of America, and a resident of Lisbon, Androscoggin county, Maine, have invented certain new and useful Improvements in Funnels, of which the following is a specification.

My invention relates to a straining and filtering attachment to be applied to funnels such as are used for filling bottles and other vessels having narrow necks.

The attachment consists, essentially, of a tube extending down into the spout of the funnel and provided with suitable means for making a tight connection therewith, said tube having on its upper end a hollow strainer preferably made separable, so that it may be more readily taken apart and cleaned.

The invention further consists of certain features applied to said strainer whereby it may be converted into a filter, said features being hereinafter set forth in the specification and claimed in the claims.

I illustrate my invention by means of the accompanying drawings, in which—

Figure 1:
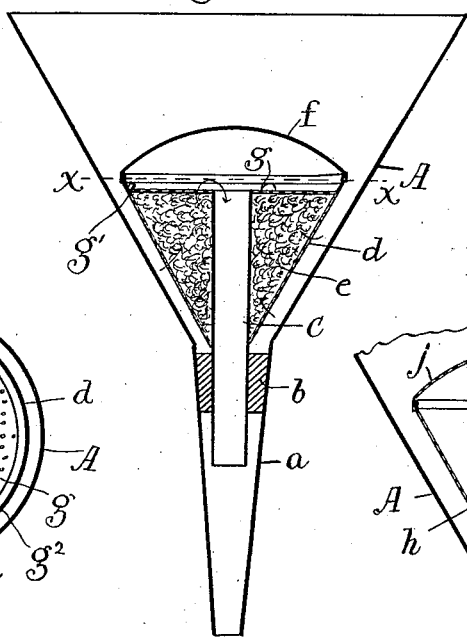
Figure 2:
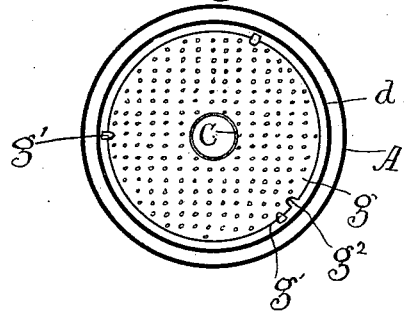
Figure 4:
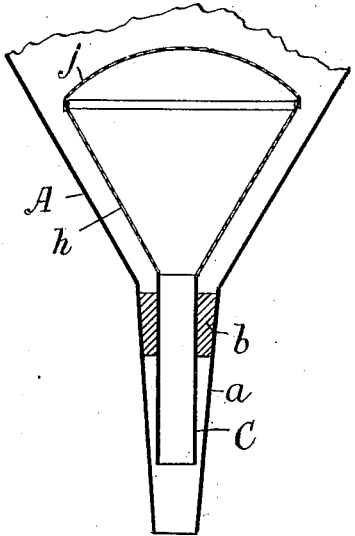
Figure 3:
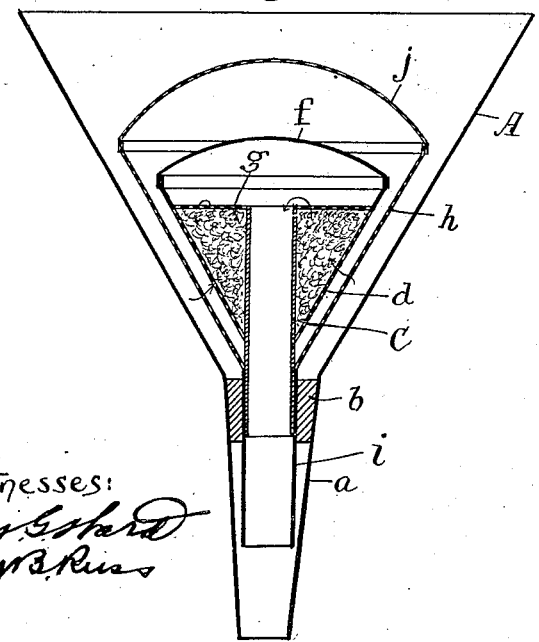

Figure 1 represents a vertical section through a funnel fitted with my attachment as used for filtering. Fig. 2 is a horizontal section on the line $x\ x$ of Fig. 1. Fig. 3 is a vertical section showing the device used as a combined strainer and filter, and Fig. 4 is a like section showing the device as a strainer.

Similar reference-letters will be used in the various figures to indicate like parts.

A represents a funnel of ordinary construction having a spout $a$. When the device is to be used as a simple strainer, I make use of the form shown in Fig. 4. In this case the tube C extends from the funnel proper down into the spout $a$, and means are provided for making a tight connection between the tube and the upper end of the spout. The means here shown consist of a plug or stopper $b$, preferably of rubber, having a central perforation through which the tube passes. Connecting with the upper end of the tube is a hollow strainer $h$, here shown as conical and having a removable cover $j$. It will be seen that this strainer may be readily inserted and taken out and that it may be easily taken apart to be cleaned.

When it is desired to use the device for the purposes of a filter, I apply to the upper portion of the hollow strainer $d$ (see Fig. 1) an imperforate top, here shown as a cap $f$, with a horizontal perforated diaphragm $g$ placed between the perforate and imperforate portions of the strainer, so as to divide the interior into an upper and a lower chamber. The tube C extends from the upper chamber down into the spout, passing through the diaphragm and the lower end of the conical strainer and forming a tight connection with the spout by means of the stopper $b$. In the lower chamber and surrounding the tube C is a quantity of filtering material $e$, which may be powdered charcoal or any other suitable substance. The diaphragm $g$ is held in place by means of three projections $g'$, which extend out from the inner surface of the conical strainer. In order to insert and remove it, I form a notch $g^2$ in one edge, and by placing the edge of the diaphragm under two of the projections and allowing the notch to come over the other projection the diaphragm may be put in place. To retain it in place, it is then slightly turned to the position shown in Fig. 2.

The operation of my filter is evident from its construction. The liquid to be filtered is poured into the funnel and passes down around the outside of the strainer and thence up through the filtering material to the upper chamber above the diaphragm and so on down through the tube. It will be seen that the liquid before it turns to enter the filtering material has to make an upward turn and change its direction, so that much of the suspended material will be deposited in the funnel just above the spout.

In Fig. 3 I show an arrangement whereby the device fitted up as a filter may be used inside of one used as a strainer by inserting the spout C of the filter in the upper end of the spout $i$ of the strainer and making the former considerably smaller than the latter.

Instead of making use of a rubber stopper for forming a tight connection between the tube and the spout of the funnel the two may be otherwise connected to make a tight joint— as, for instance, by soldering the tube directly to the spout.

I claim—

1. The combination with a funnel, of a hollow strainer therein having an imperforate upper portion, a perforated diaphragm between the perforate and imperforate portions of the strainer and a tube passing through said diaphragm and connecting the space above it with the spout of the funnel and making a tight connection with said spout.

2. The combination with a funnel, of a hollow strainer therein having an imperforate upper portion, a perforated diaphragm between the perforate and imperforate portions of the strainer, a tube passing through said diaphragm and connecting the space above it with the spout of the funnel and a stopper surrounding said tube for making a tight joint with the spout.

3. The combination with a funnel of a conical strainer therein having an imperforate cap on its upper end, a perforated diaphragm below said cap and a tube passing through said diaphragm and connecting the space above it with the spout of the funnel and making a tight connection therewith.

4. The combination with a funnel of a conical strainer therein having an arched or convex imperforate cap, a perforated diaphragm at the top of the conical portion of the strainer and below said cap, a tube leading from said diaphragm and connecting the space above it with the spout of the funnel and a stopper surrounding said tube for forming a tight joint with the spout.

5. The combination with a funnel of a conical strainer therein having an arched or convex imperforate cap, a perforated diaphragm between the conical portion of the strainer and the cap forming an upper and a lower chamber, a tube leading from the upper chamber through the diaphragm and the lower chamber and into the spout of the funnel, a stopper surrounding said tube for forming a tight joint with the spout and filtering material filling the lower chamber.

Signed at Boston, Massachusetts, this 20th day of September, 1901.

WILLARD JONES.

Witnesses:
ALICE J. MURRAY,
FREDK. K. DAGGETT.